(No Model.) 2 Sheets—Sheet 1.
W. J. MACKEY.
WAGON BRAKE.
No. 380,502. Patented Apr. 3, 1888.
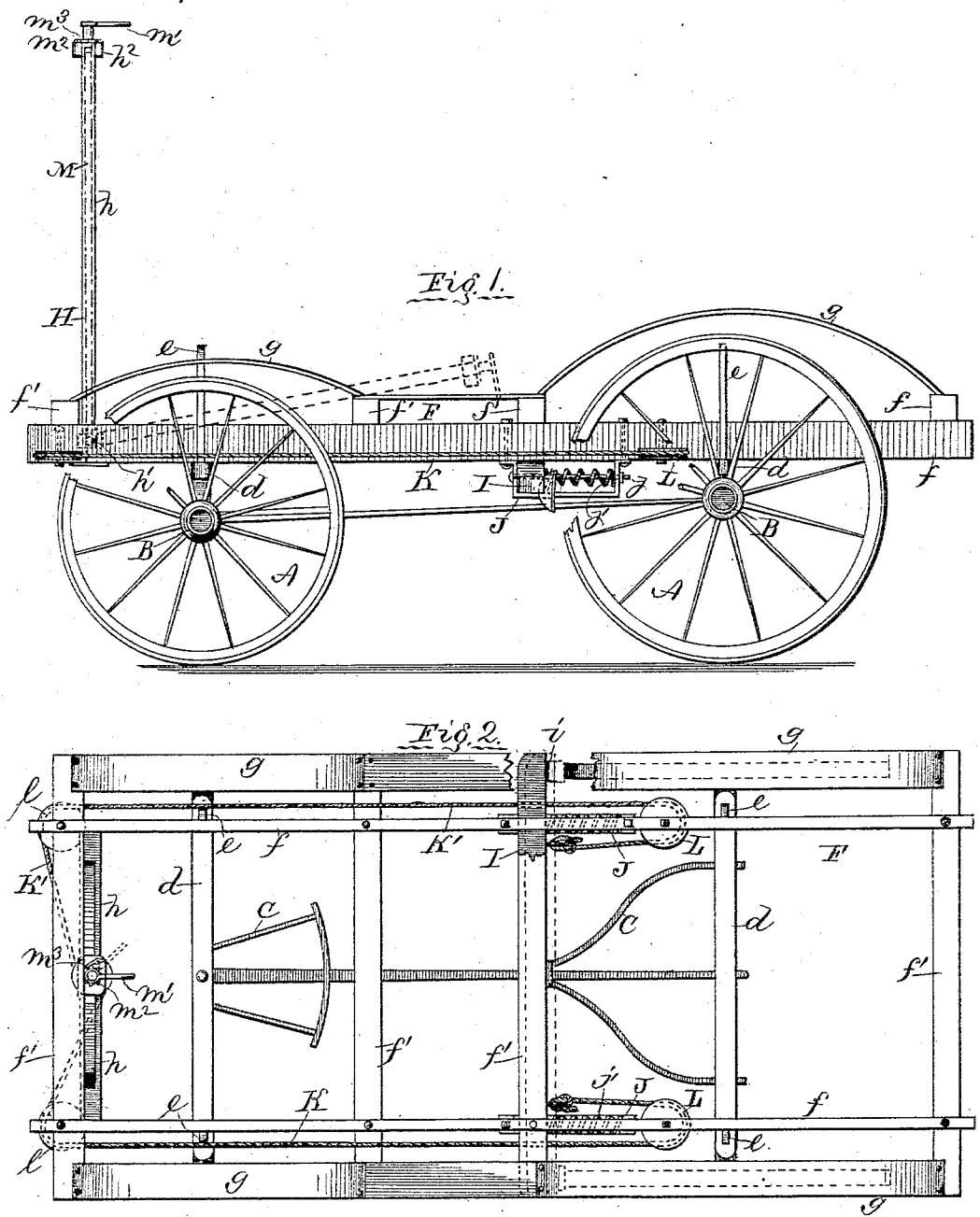
Witnesses:
J. B. Richards.
James Sommers.
Inventor,
Wm. J. Mackey,
By W. B. Richards,
Atty.

(No Model.) 2 Sheets—Sheet 2.

W. J. MACKEY.
WAGON BRAKE.

No. 380,502. Patented Apr. 3, 1888.

Witnesses:
P. R. Richards.
James Sommers.

Inventor:
Wm. J. Mackey,
By W. P. Richards,
Atty.

UNITED STATES PATENT OFFICE.

WILLIAM J. MACKEY, OF TRURO, ILLINOIS.

WAGON-BRAKE.

SPECIFICATION forming part of Letters Patent No. 380,502, dated April 3, 1888.

Application filed January 3, 1888. Serial No. 259,584. (No model.)

*To all whom it may concern:*

Be it known that I, WILLIAM J. MACKEY, a citizen of the United States, residing at Truro, in the county of Knox and State of Illinois, have invented certain new and useful Improvements in Wagon-Brakes for Use with Hay-Racks, of which the following is a specification.

The object of this invention is to furnish a wagon-brake which can be used with a hay-rack and readily operated by a person seated on a load of hay; and the invention consists in constructions and combinations hereinafter described and claimed.

Figure 3:
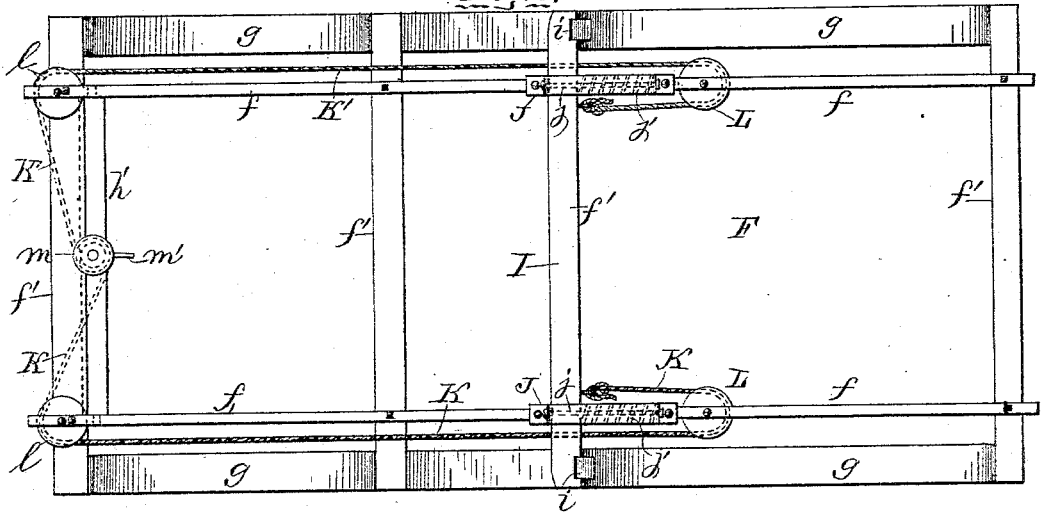
Figure 4:
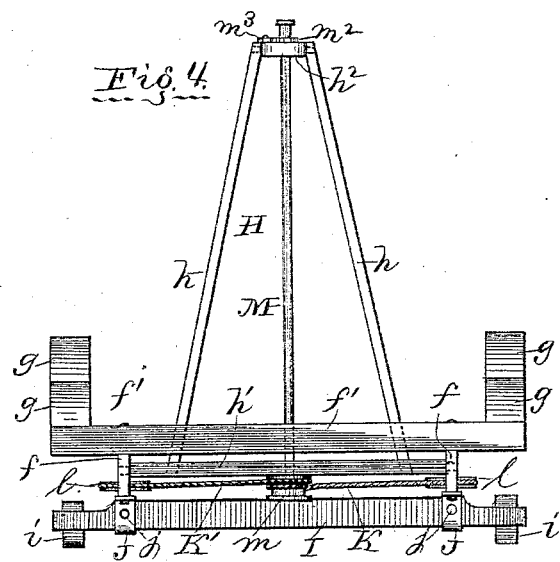

In the accompanying drawings, which illustrate one method of applying and using my improvement with a wagon and hay rack, Figure 1 is a side elevation partly broken away to show parts in rear of said broken-away parts; Fig. 2, a top plan, also partly broken away; Fig. 3, a plan of the hay-rack and brake seen from below; Fig. 4, a front elevation of the hay-rack and brake.

In the different figures of the drawings the same reference-letter is used to designate the same part.

In the drawings I have shown the running-gear of an ordinary wagon, with wheels A, axles $b$, hounds $c$, bolsters $d$, and standards $e$, and an ordinary type of hay-rack, F, consisting of side beams, $f$, cross-beams $f'$, bows or wheel-covers $g$, and a standard, H, which is formed of bars $h$, fixed at their lower ends to a bar, $h'$, which extends laterally across the hay-rack and is journaled at its ends in the side beams, $f$, in such manner that the standard H may be turned down rearwardly, if desired, as shown at Fig. 1, and will be held in an upright position by the hay at one side thereof and by resting at its other side against the forward cross-bar, $f'$. The bars $h$ approach each other toward their upper ends and are there connected by a bar, $h^2$.

The standard H, as I have shown and described it, is an ordinary construction, and may be formed as described, or in any other desirable and ordinary manner in which it will act to hold the hay properly at the forward end of the rack, at a proper distance from the draft-animals, and to form an attachment for the forward end of the boom or binding-pole when so desired, and will extend upwardly to within easy reach of the driver when seated or standing on a load of hay on the rack.

The brake-bar I, having a brake-shoe, $i$, on each of its ends, is carried in stirrups J, one fixed to and beneath each bar $f$, and each stirrup J carries a rod, $j$, which passes through its adjacent end of the brake-bar, and thus serves to hold the brake-bar from displacement lengthwise of itself, while each rod $j$ also carries a spiral spring, $j'$, located between the brake-bar and the rear end of the stirrup J and adapted to hold the brake-bar with a yielding force in the position shown at Fig. 1, with the brake-shoes out of contact with the wagon-wheels.

A cord, K, is secured at one end to or near one end of the brake-bar, and passes outwardly around a grooved pulley, L, which is journaled by suitable axial bearings in a recess in the lower side of the adjacent beam $f$ and in rear of the brake-bar I. The cord thence passes forward and around a grooved pulley, $l$, suitably journaled in a recess in the lower side and near the forward end of the same bar, $f$, which carries the pulley L, and thence transversely of the rack to a drum, $m$, to which it is secured. The drum $m$ is carried on the lower end of a shaft or rod, M, which has suitable bearings in the bars $h'\ h^2$ and is turned down and elevated with said bars. A cord, K', is connected with the other end of the brake-bar and passes around pulleys similarly arranged and similarly lettered to the pulleys L and $l$, and is also secured at its forward end to the drum $m$, but is wound on said drum in an opposite direction to the cord K. The upper end of the shaft M carries a crank, $m'$, a ratchet-wheel, $m^2$, and a detent-pawl, $m^3$. The shaft M is turned by the crank $m'$ to apply the brake to the wagon-wheels in an evident manner, and when so applied the detent-pawl is engaged with the ratchet-wheel to hold the brake until it is desired to release it, which is done by disengaging the pawl $m^3$ from the ratchet-wheel $m^2$, when the springs $j'$ will force the brake away from the wheels.

This device of course will be useful in hauling any kind of grain or straw, as well as hay, and with it the driver can apply the brakes without getting off the load.

Having thus described my invention, what I claim as new, and desire to secure by Letters Patent, is—

1. In combination with a hay-rack and wagon and a standard, H, located on said hay-rack, a shaft, M, carrying drum $m$, cords K K', pulleys L $l$, brake-bar, and springs $j'$, substantially as and for the purpose specified.

2. In combination with a hay-rack and wagon and a standard, H, located on said hay-rack, a shaft, M, provided with suitable appliances at its upper end for rotating it, and cords extending from said shaft to a brake-bar, substantially as and for the purpose specified.

3. In combination with a hay-rack and wagon, and a standard, H, located on said hay-rack, shaft M, having ratchet-wheel and pawl, a crank and drum, $m$, the cords K K', pulleys L $l$, brake-bar, springs $j'$, and rods $j$, substantially as and for the purpose specified.

4. In combination with a hay-rack and wagon, a shaft, M, which extends upwardly from the hay-rack to where it can be reached by the driver on a load of hay, and is connected at its lower end with cords which it is adapted to wind up, and which extend to and are connected with the brake-bar I, substantially as and for the purpose specified.

In testimony whereof I affix my signature in presence of two witnesses.

WILLIAM J. MACKEY.

Witnesses:
D. W. STEVENS,
WM. E. BROWN.